(12) United States Patent
Lee et al.

(10) Patent No.: US 8,279,980 B1
(45) Date of Patent: Oct. 2, 2012

(54) DETECTOR FOR SINGLE-USER CODED SIGNALS IN THE PRESENCE OF INTERFERENCE

(75) Inventors: Jungwon Lee, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 806 days.

(21) Appl. No.: 12/468,631

(22) Filed: May 19, 2009

Related U.S. Application Data

(60) Provisional application No. 61/103,017, filed on Oct. 6, 2008, provisional application No. 61/057,086, filed on May 29, 2008.

(51) Int. Cl.
*H04L 27/06* (2006.01)
(52) U.S. Cl. ....................................................... 375/340
(58) Field of Classification Search .................. 375/340, 375/341, 316, 347, 349; 370/312, 321, 465; 714/25, 797
See application file for complete search history.

(56) References Cited

U.S. PATENT DOCUMENTS

| 7,505,526 | B2 * | 3/2009 | Coffey et al. | ................. 375/262 |
| 2004/0153789 | A1 * | 8/2004 | Fuchigami et al. | ............. 714/25 |

OTHER PUBLICATIONS

Carleial; "A Case Where Interference Does Not Reduce Capacity", IEEE Transactions on Information Theory, Sep. 1975, pp. 569-570.
Cendrillon, et al.; "Optimal Multiuser Spectrum Balancing for Digital Subscriber Lines", IEEE Transactions on Communications, vol. 54, No. 5, May 2006, pp. 922-933.
Cioffi; "Part I: Signal Processing and Detection", 101 pages.
Etkin, et al.; "Gaussian Interference Channel Capacity to Within One Bit: the General Case", IEEE, ISIT2007, Nice, France, Jun. 24-29, 2007, pp. 2181-2185.
Han, et al.; "A New Achievable Rate Region for the Interference Channel", IEEE Transactions on Information Theory, vol. IT-27, No. 1, Jan. 1981, pp. 49-60.
Lee, et al.; "Multi-User Discrete Bit-Loading for DMT-based DSL Systems", IEEE, 2002, pp. 1259-1263.
Rao, et al.; "The Gaussian Interference Channel at Low SNR", IEEE, ISIT 2004, Chicago, USA, Jun. 27-Jul. 2, 2004, p. 416.
Sason, Igal; "On Achievable Rate Regions for the Gaussian Interference Channel", IEEE, ISIT 2004, Chicago, USA, Jun. 27-Jul. 2, 2004, 1 page.
Yu, et al.; "Distributed Multiuser Power Control for Digital Subscriber Lines"; IEEE Journal on Selected Areas in Communications, vol. 20, No. 5, Jun. 2002, pp. 1105-1115.

\* cited by examiner

*Primary Examiner* — Khai Tran

(57) ABSTRACT

Techniques are provided for detecting a coded signal in the presence of interference. In an embodiment, a primary transmitter corresponds to a desired transmitter, and one or more secondary transmitters correspond to interfering transmitters. Received symbols, which include interference and additive noise, are filtered to recover a set of original message bits. An estimate of the set of original message bits may be determined using an ordered successive interference cancellation (SIC) decoder that uses either a SIC detector or an AWGN-based detector, depending on the signal-to-interference ratio at a primary receiver.

20 Claims, 6 Drawing Sheets

DETECTOR FOR SINGLE-USER CODED SIGNALS IN THE PRESENCE OF INTERFERENCE

CROSS-REFERENCE TO RELATED APPLICATIONS

This claims the benefit under 35 U.S.C. §119(e) of U.S. Provisional Application No. 61/057,086, filed May 29, 2008, and U.S. Provisional Application No. 61/103,017, filed Oct. 6, 2008, which are hereby incorporated by reference herein in their entirety.

BACKGROUND OF THE DISCLOSURE

The disclosed technology relates generally to decreasing the bit- and/or symbol-error rate of wired or wireless communications system when one or more interfering transmitters (or users) degrade the quality of a received signal. More particularly, the disclosed technology relates to new detector and decoder techniques for reducing the decoding error rate and/or decoding computational complexity.

The interference channel, e.g., the two-user Gaussian interference channel, is one of the most widely used and practically relevant communications channel models. For example, the interference channel model may include multiple transmitters (e.g., corresponding to two users) communicating to a number of receivers (e.g., each receiver belong to exactly one user) in the presence of interference and/or additive Gaussian noise. Further, the interference channel may further specify no cooperation between the transmitters and/or receivers of the various users.

The interference channel may be used to model a wide variety of deployments of commercial interest. For example, the Gaussian interference channel may be used to model a cellular system where neither base stations nor mobile stations coordinate transmissions. Additionally or alternatively, the Gaussian interference channel may be used to model transmissions and leakage in a digital subscriber line (DSL) modem downlink where no real-time coordination exists among modems or among customer premise equipment.

SUMMARY OF THE DISCLOSURE

Communications systems, techniques, and methods are disclosed for detecting a coded signal in the presence of interference. In particular, the disclosed invention relates to techniques for decoding a set of message bits from a set of received symbols, where the set of received symbols are transmitted by a primary transmitter and one or more secondary transmitters. In an embodiment, the primary transmitter corresponds to a desired transmitter, and the one or more secondary transmitters correspond to interfering transmitters.

In an embodiment, the set received symbols include interference and additive noise, and a filter is applied to the set of received symbols. A set of constellation points is determined from the filtered symbols, where each point in the set of constellation points is obtained by combining an encoding set associated with the primary transmitter and one or more secondary encoding sets associated with the one or more secondary transmitters.

In an embodiment, a first symbol is selected from the set of filtered symbols, and a value of a point in the set of constellation points that is closest to the first symbol is determined. Similarly, a second symbol is selected from the set of filtered symbols, and a value of a point in the set of constellation points that is closest to the second symbol is determined. The set of message bits is then decoded, at least partially based on the values associated with the first and second selected symbols.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
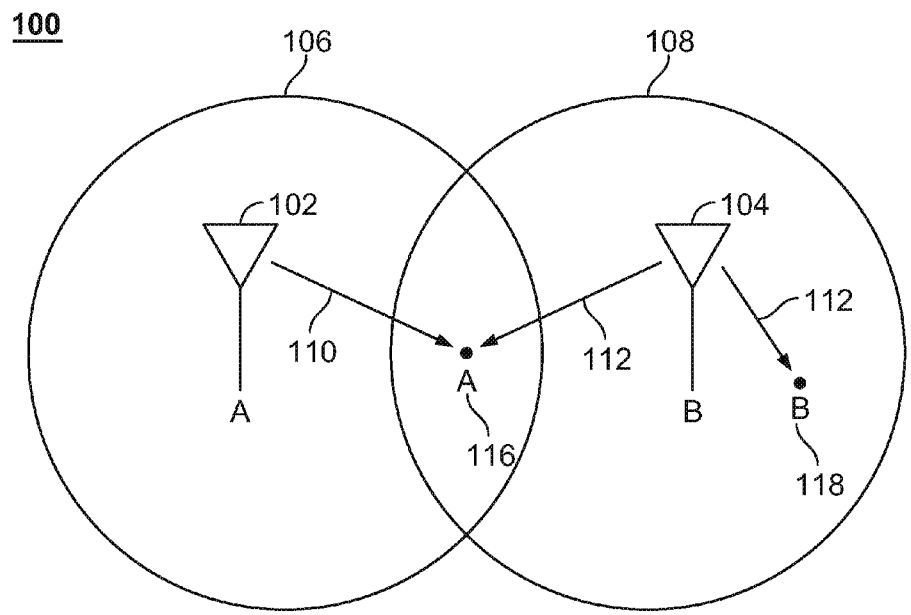
FIGS. 1A and 1B depict a simplified wireless and wired interference channels, respectively.

FIG. 1A depicts a simplified wireless interference channel in accordance with an embodiment. Wireless communications system 100 may represent cellular communications system that has multiple users and that generates interference due to, for example, simultaneous transmissions by at least two users. Communications system 100 may employ the disclosed interference-aware hard-decision receiver in accordance with an embodiment.

Communications system 100 includes base station A 102 and mobile user A 116. Base station A 102 corresponds to, for example, a cellular base station or tower, and transmits desired signal 110 to mobile user A 116. Desired signal 110 corresponds to, for example, a Global System for Mobile communications (GSM) signal, Code-Division Multiple Access (CDMA) signal, Long-Term Evolution (LTE) signal, WiMAX signal, and/or any other suitable wireless signal. Desired signal 110 may attenuate with distance from base station A 102 and therefore may have a limited (or "effective") communications range. For example, desired signal 110 may radiate an effective power only within communications radius 106, which may be a circular or non-circular pattern. Mobile user A 116, located within communications radius A 106, may successfully receive desired signal 110, along with noise and/or interference.

Mobile user A 116 may receive interference from transmissions intended for another user in communications system 100, e.g., mobile user B 118. For example, communications system 100 may include a second base station, e.g., base station B 104, which transmits signal 112 intended for mobile user B 118 (but not for mobile user A 102). Signal 112 may have an effective power within a certain communications radius, such as communications radius 108. Mobile user A 116, also located within communications radius 108, may therefore receive signal 112, which may be regarded as an interference signal by the detection and decoding hardware and processes of mobile user A 116. Such interference received by mobile user A 116 may generally degrade the quality of the overall signal (for example, the overall signal may include desired signal 110, signal 112, and additive noise terms), and may lead to diminished decoding performance. For example, interference may increase the decoding bit- or symbol-error rate (SER), and/or may diminish the quality, and/or increase the latency of an application being transmitted by base station A 102 to mobile user A 116. Therefore, there exists a need for a novel decoder to detect and decode the interference signal 112 during the detection and/or decoding process employed at mobile user A 116.

Figure 1B:
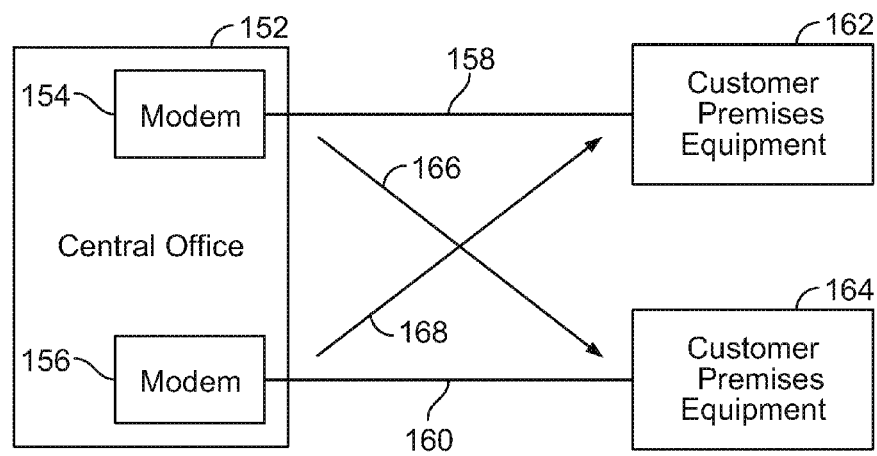

FIG. 1B depicts a simplified wired interference channel in accordance with an embodiment. Wired communications system 150 may represent a digital subscriber line (DSL) system that has multiple users and that generates interference due to, for example, high-frequency cross-talk between transmission lines or cables. Communications system 150 may employ the disclosed interference-aware hard-decision receiver in accordance with an embodiment.

Communications system 150 originates data transmission at central office 152. Central office 152 corresponds to, for example, a central hub of a telephone network and/or to a data center of an internet and telephone service provider. Central office 152 includes one or more modems for transmitting information to users. For example, central office 150 may include twenty-five, fifty, or any other suitable number of modems for transmitting information to multiple downstream users. For example, Modem 154 and modem 156 represent two such modems in accordance with an embodiment.

The modems used by central office 152, for example, modem 154 and modem 156, each include a bundled pair of transmission lines. For example, modem 154 includes bundled pair 158 for transmission to customer premises equipment 162, and modem 156 includes bundled pair 160 for transmission to customer premises equipment 164. Customer premises equipment 162 and 164 each correspond to a terminal, physically located on or near the premises of one or more users. The term customer premises equipment may also be known as customer-provided equipment.

The signal received at customer premises equipment 162 (or alternatively, customer premises equipment 164) may include cross-talk interference. For example, leakage may occur between bundled pair 158 and 160, and thus cross-talk interference 168 from bundled pair 160 may be introduced into the signal received at customer premises equipment 162. Similarly, cross-talk interference 166 from bundled pair 158 may be introduced into the signal received at customer premises equipment 164. Interference received by customer premises equipment 162 may generally degrade the quality of the overall signal transmitted on bundled pair 158, and may lead to diminished decoding performance at customer premises equipment 162. For example, interference may increase the decoding bit-error rate (BER) or SER, and/or may diminish the quality, and increase the latency, of an application being transmitted by modem 154 to customer premises equipment 162. Further, modems 154 and 156 may be incapable of cooperation, and similarly, customer premises equipment 162 and 164 may be incapable of cooperation. Therefore, there exists a need for a novel decoder to estimate and/or remove the cross-talk interference signal 168 during the detection and/or decoding process employed by customer premises equipment 162.

Figure 2:
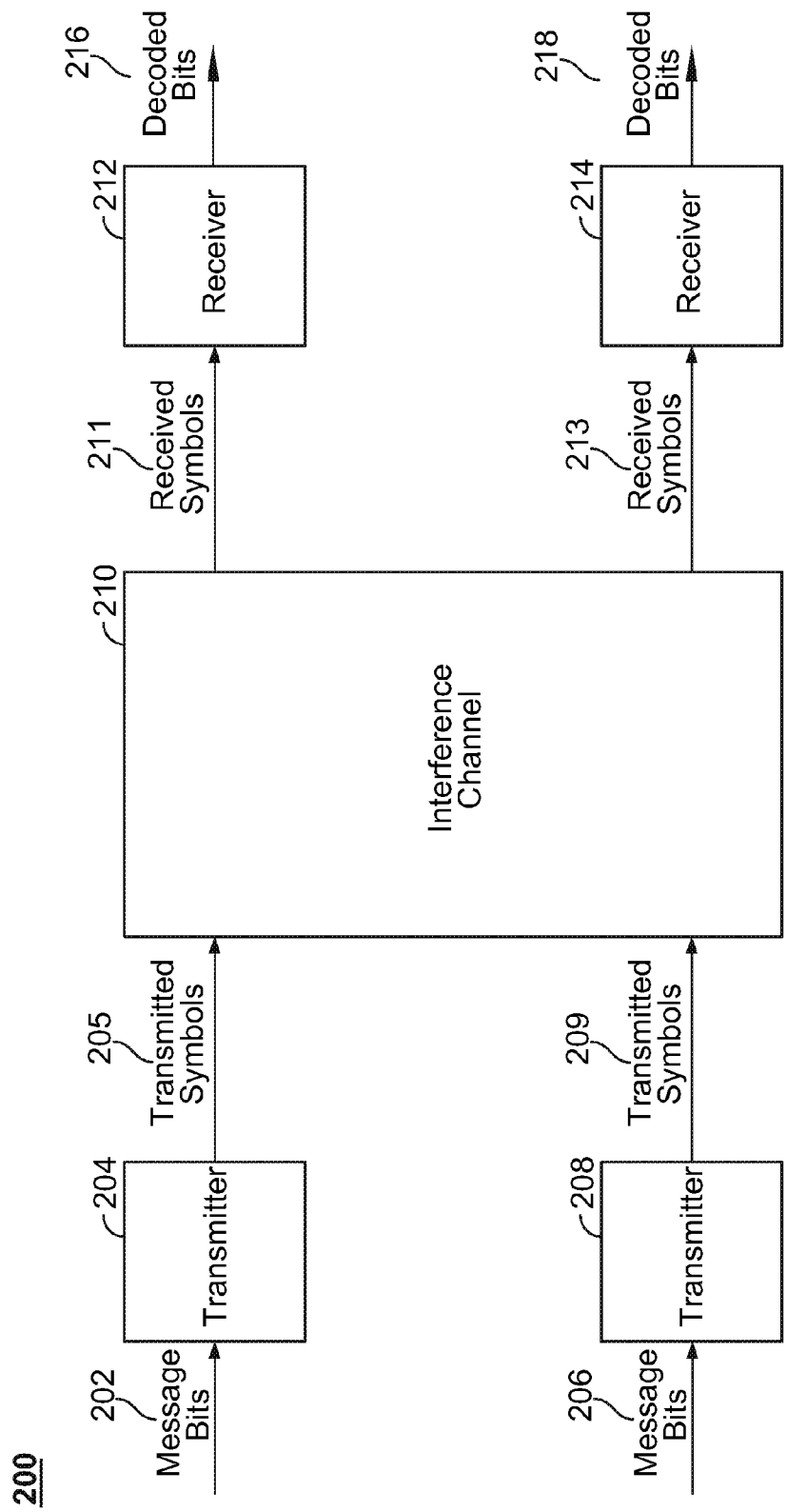
FIG. 2 depicts a model of an interference channel.

FIG. 2 depicts a model of an interference channel in accordance with an embodiment. Communications system 200 may be used to model, for example, a wired or wireless communications system in which interference is present, including communications system 100 (FIG. 1A) or 150 (FIG. 1B). As described below, communications system 200 includes two transmitter-receiver pairs. For example, each transmitter transmits a separate stream of information intended for one of the two receivers. However, the information received at the first receiver, for example, may include interference produced by the second transmitter. Similarly, the information received at the second receiver may include interference produced by the first transmitter. In an embodiment, the "interference" at the first receiver, for example, is a scaled version of the signal transmitted by the second transmitter.

Communications system 200 produces message bits 202 and 206 to be transmitted to receiver 212 and 214, respectively. Message bits 202 and 206 each corresponds to coded or uncoded data. For example, message bits 202 may correspond to the output of a computer program in a computer application, or may correspond to the output of a voice encoder in a cellular phone application. Message bits 202 (or, alternatively, message bits 206) may be encoded using any suitable encoding technique, such as block-coding, Reed-Solomon coding, and/or Turbo-coding. Further, message bits 202 may be encoded using a similar or different technique that that used to encode message bits 206. For example, message bits 202 may be encoded at a different data transmission rate, with difference symbol timings, and/or with a different modulation than those used to encode message bits 206.

Transmitter 204, for example, transforms message bits 202 into symbols using a signal constellation such as Binary Phase Shift Keying (BPSK), Quadrature Phase Shift Keying (QPSK), Quadrature Amplitude Modulation (QAM), and/or any other suitable signal constellation. The number of signal points in the constellation used by transmitter 204 may be determined based on factors including the desired data transmission rate of communications system 200, and/or the expected operational signal-to-noise ratio (SNR) or signal-to-interference ratio (SIR) at receiver 212. Transmitter 204 corresponds to a wireless transmitter (e.g., base station A 102 of FIG. 1A) or to a wired transmitter (e.g., modem 154 of FIG. 1B). Transmitter 204 produces transmitted symbols 205 for transmission through a channel, for example, interference channel 210. Transmitter 208 operates similarly or identically to the techniques described above for transmitter 204. For example, transmitter 208 transforms message bits 206 into symbols using a signal constellation as described above for transmitter 204, and transmitter 208 produces transmitted symbols 209 for transmission through, for example, interference channel 210.

Transmitted symbols 205 and 209 are transmitted through interference channel 210 to receivers 212 and 214, respectively. Interference channel 210 may generally couple or otherwise introduce interference between transmitted symbols 205 and transmitted symbols 209, so that received symbols 211, for example, may contain artifacts of transmitted symbols 209. Similarly, received symbols 213 may contain artifacts of transmitted symbols 205. For example, received symbols 211 may contain a scaled (i.e., attenuated) version of transmitted symbols 209, or a non-linearly distorted version of transmitted symbols 209. Received symbols 211 may alternatively or additionally contain a delayed or offset version of transmitted symbols 209. In addition to coupling, interference channel 210 may introduce noise, such as additive white Gaussian noise (AWGN) of a certain power to received symbols 211 and/or 213. Received symbols 211 are received by receiver 212. Receiver 212 may use a detector and decoder (not shown) to produce an estimate of message bits 216, which may be referred to as decoded bits 202. Similarly, received symbols 213 are received by receiver 214, which may produce decoded bits 218 as an estimate of message bits 206.

Figure 3:
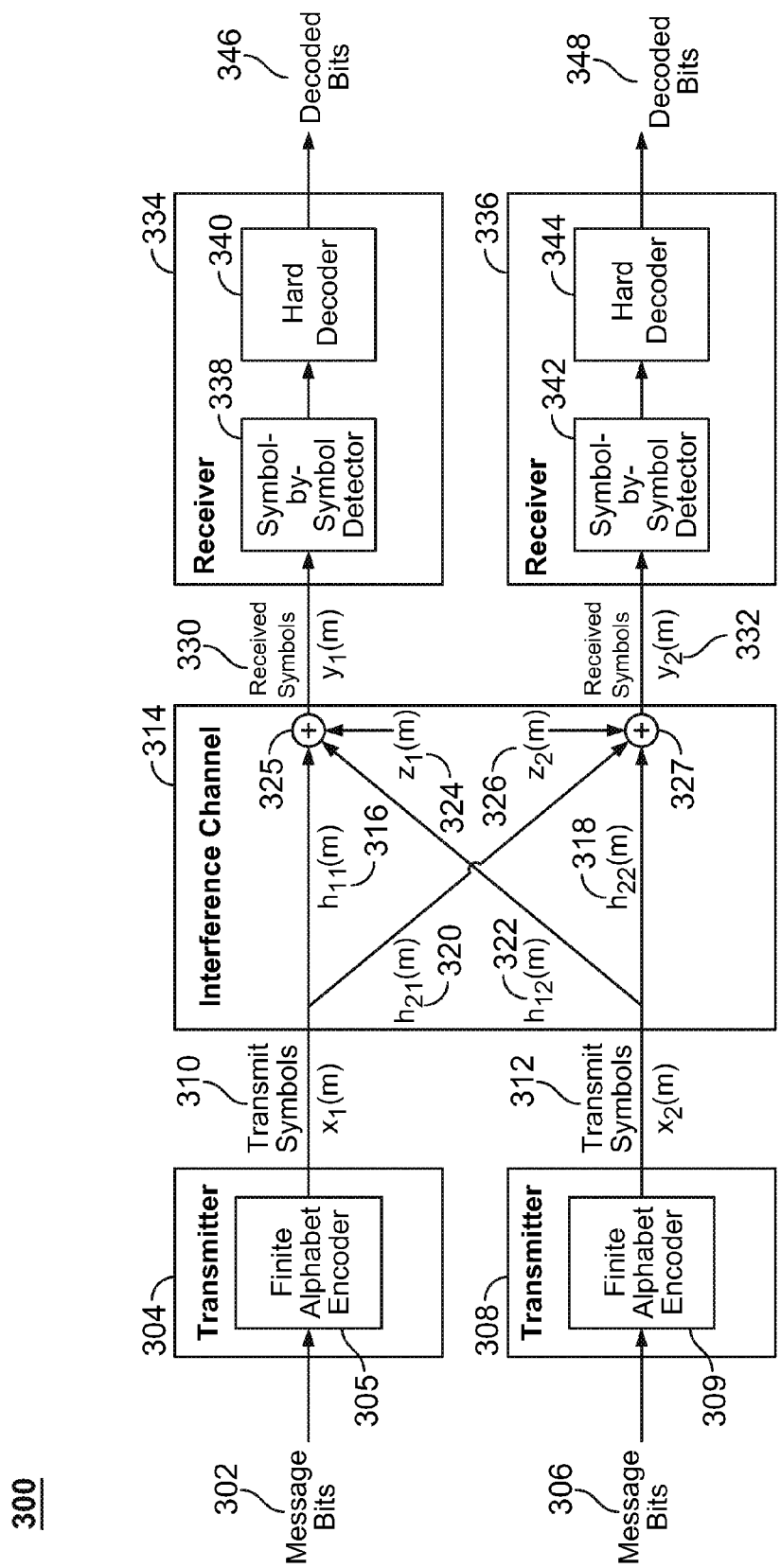
FIG. 3 depicts a model of a two-user Gaussian interference channel.

FIG. 3 depicts a model of a two-user Gaussian interference channel in accordance with an embodiment. Communications system 300 may be a further embodiment of communications system 200 (FIG. 2). Communications system 300 may be used to model a scenario where the interference signal received a first receiver is a scaled version of the signal transmitted by a second transmitter, where the scale value is itself time-variant. For example, communications system 300 may be used to model a two-user Gaussian interference channel, where each receiver receives an intended signal from a intended transmitter and interference signal from an interfering transmitter in the presence of background AWGN.

In communications system 300, message bits 302 and 306 may be similar or identical to message bits 202 and 206, respectively (both of FIG. 2). Similarly, transmitter 304 and 308 may be similar to identical to transmitter 204 and 208, respectively (both of FIG. 2). In an embodiment, transmitter 304 uses a finite alphabet encoder 305, and transmitter 308 may uses a finite alphabet encoder 309. Finite alphabet encoders 304 and 308 use a finite number of real- or complex-valued signal points to produce transmit symbols 310 and 312, respectively. For example, finite alphabet encoders 304 and 308 may use BPSK or a higher-order phase shift keying modulation, QAM, and/or pulse-amplitude modulation (PAM) modulation.

In an embodiment, transmitter 304 corresponds to, or belongs to, a different entity than transmitter 308 and does not communicate or cooperate with transmitter 308. For example, transmitter 304 may correspond to a first base station, for example, base station A 102 (FIG. 1A), and transmitter 308 may correspond to a second base station, for example, base station B 104 (FIG. 1B). For at least this reason, finite alphabet encoders 304 and 308 may employ different modulations. For example, in an embodiment, finite alphabet encoder 305 uses BPSK to encode message bits 302, and finite alphabet encoder 309 uses QAM to encode message bits 306. In addition, transmitter 304 may not coordinate or be aware of the modulation, symbol-timings, and/or any other parameters of transmitter 308. Similarly, transmitter 308 may not coordinate or be aware of the modulation, symbol-timings, and/or any other parameters of transmitter 304.

In an embodiment, interference channel 314 may be a further embodiment of interference channel 210 (FIG. 2), and may correspond to a two-user Gaussian interference channel. In an embodiment, the received symbols 330 and 332 may be represented using the following mathematical equations:

$$y_1(m) = h_{11}(m)x_1(m) + h_{12}(m)x_2(m) + z_1(m), \quad (1)$$

$$y_2(m) = h_{22}(m)x_2(m) + h_{21}(m)x_1(m) + z_2(m), \quad (2)$$

where $y_1(m)$ and $y_2(m)$ denote received symbols 330 and 332, respectively, at time m, $h_{11}(m)$ and $h_{22}(m)$ denote channel state information 316 and 318, respectively (for example, the fading state, from transmitter 304 to receiver 334, and transmitter 308 to receiver 336 at time m, respectively), and $x_1(m)$ and $x_2(m)$ denote transmit symbols 310 and transmit symbols 312 at time m, respectively. Further, in equations (1) and (2), above, $h_{12}(m)$ (labeled 322 in FIG. 3) and $h_{21}(m)$ (labeled 320 in FIG. 3) denote the channel state of the interference channel between the first transmission stream (i.e., between transmitter 304 and receiver 334) and the second transmission stream (i.e., between transmitter 308 and receiver 336) in accordance with an embodiment. In particular, $h_{12}(m)$ denotes the scalar or vector value of the interference channel received at receiver 334, and $h_{21}(m)$ denotes the scalar or vector value of the interference channel received at receiver 336, at time m. In equations (1) and (2), above, $z_1(m)$ (labeled 324 in FIG. 3) and $z_2(m)$ (labeled 326 in FIG. 3) denote additive noise at time m at receiver 334 and receiver 336, respectively. For example, in an embodiment, $z_1(m)$ and $z_2(m)$ denote independent sequences of uncorrelated AWGN. The index m is used to represent time for clarity of the presentation. Alternatively, the index m can be used to represent frequency, spatial position, and/or any other suitable dimension.

Receivers 334 and 336 may correspond to further embodiments of receivers 212 and 214 (both of FIG. 2). In an embodiment, receiver 334 and/or 336 may be designed based on the maximum-likelihood (ML) principle, in which each receiver would use suitable circuitry and/or signal processing algorithms to perform an exhaustive search of all received symbols. However, the computational complexity of this approach is large and may generally increase exponentially with codeword length, e.g., of message bits 302 (i.e., in the case that message bits 302 are encoded).

Alternatively, receiver 334 and 336 may be designed using a lower complexity technique. Such a technique may be advantageous in decreasing decoding time, power consumption, and/or the cost of a receiver, while still providing nearly the same decoding performance of an ML-based receiver. In an embodiment, receiver 334 and/or 336 are constrained to include a symbol-by-symbol (or "symbol-wise") detector followed by an independent decoder. For example, receiver 334 uses symbol-by-symbol detector 338 and hard decoder 340 to mitigate the effect of interference in received symbols 330 to produce decoded bits 346. (Similarly, receiver 332 uses symbol-by-symbol detector 342 and hard decoder 344 to mitigate the effect of interference in received symbols 332 to produce received message bits 348.) Such an approach to the design of receivers 334 and 336 may be advantageous not only in lowering the computational complexity of the decoding process, but also in simplifying system design by allowing for optimization of the detector (e.g., symbol-by-symbol detector 338) independently from the decoder (e.g., hard decoder 340).

Receivers 334 and 336 may use any suitable combination of symbol-by-symbol detector and hard decoder to decode received symbols 330 and 332, respectively. In an embodiment, symbol-by-symbol detector 338 treats interference and additive noise as AWGN of a certain variance. For example, symbol-by-symbol detector 338 first divides received symbol $y_1(m)$ by the direct channel gain $h_{11}(m)$ and then map it to the closest point of the signal constellation used by the corresponding encoder, i.e., finite alphabet encoder 305. In this embodiment, the interference term at receiver 334, i.e. $h_{12}(m)x_2(m)$, is aggregated with the noise term $z_1(m)$ and the quantity, $h_{12}(m)x_2(m) + z_1(m)$, is treated as AWGN by symbol-by-symbol detector 338. (A similar process may be used by receiver 336.). This detector may be referred to as the AWGN-based detector.

The AWGN-based detector described above may be the optimal, or nearly optimal, symbol-wise detector 338 if the distribution of the unwanted signals (i.e., the sum of noise and interference, $h_{12}(m)x_2(17) + z_1(m)$ for receiver 334) is Gaussian. Thus, the AWGN-based detector may be advantageously used by receiver 334 when transmitter 308 employs a Gaussian codebook.

In practice, transmitter 308 uses finite alphabet encoder 309, which is not Gaussian (as finite alphabet encoder 309 uses only a finite number of constellation points to modulate message bits 306). Therefore, in an embodiment, receiver 334 (and additionally, receiver 336) uses the symbol-wise joint ML detector as symbol-by-symbol detector 338. The symbol-wise joint ML detector may be advantageous in improving the SER performance of receiver 334 and/or 336, at least because the symbol-wise joint ML detector may take into account the actual distribution of the interference term (i.e., the term $h_{12}(m)x_2(m) + z_1(m)$ at receiver 334 and the term $h_{21}(m)x_1(m) + z_1(m)$ at receiver 336).

At receiver 334, for example, the distribution of the interference term $h_{12}(m)x_2(m)+z_1(m)$ is determined by scaling the known distribution of $x_2(m)$ by $h_{12}(m)$ at each time instant m, when $h_{12}(m)$ is known at receiver. Thus, if the modulation scheme used by transmitter 308 is known to receiver 334, receiver 334 may determine the distribution of the interference term and utilize the distribution of the interference term to improve detection performance, e.g., by decreasing the SER performance of receiver 334.

The symbol-wise joint ML detector disclosed herein, in an embodiment, estimates $x_1(m)$ and $x_2(m)$ jointly rather than sequentially at each time instant m. Such a joint estimation scheme may be advantageous in preventing error propagation in successively decoded symbols by symbol-by-symbol detector 338. Symbol-wise joint ML detection of $x_1(m)$ by symbol-by-symbol detector 338 may be accomplished by the following three steps (symbol-wise joint ML detector of $x_2(m)$ by symbol-by-symbol hard detector 340 may be implemented in an analogous manner): First, a new set of combined received constellation points $h_{11}(m)x_1(m)+h_{12}(m)x_2(m)$ is formed, e.g., using the signal constellations employed by finite alphabet encoders 304 and 308, respectively. These combined received constellation points are indexed by $(x_1, x_2)$ and denoted by $h_{11}S_1+h_{12}S_2$, where $S_1$ and $S_2$ denote the signal constellation employed by finite alphabet encoders 304 and 308, respectively. Symbol-wise joint ML detector 338, for example, then determines the constellation point $(x_1, x_2)= (\hat{x}_1, \hat{x}_2)$ that is closest to $y_1(m)$ among all the new combined constellation points in $h_{11}(m)x_1(m)+h_{12}(m)x_2(m)$. This decoding rule can be represented as joint ML estimation of $x_1$ and $x_2$. Further, the joint ML estimation is equivalent to minimum distance estimation because the background noise is Gaussian. Finally, $\hat{x}_1$ from $(\hat{x}_1, \hat{x}_2)$ is chosen as the estimate of $x_1(m)$. In this scheme, $x_2$ (i.e., $x_2(m)$) is also estimated, but only through the joint estimation of $x_1$ and $x_2$. Thus, the estimate of $x_1$ does not rely directly on the estimate of $x_2$. The estimate of $x_2$ may be unreliable for small SIR. However, the correctness of the estimate of $x_2$ does not directly affect $\hat{x}_1$, and, consequently, does not directly effect the performance of hard decoder 340. When symbol-by-symbol detector 338 employs the symbol-wise joint ML detector, $\hat{x}_1$ may be correct even if $\hat{x}_2$ is incorrect.

Communications system 200 (FIG. 2) and communications system 300 (FIG. 3) depict two-user systems (i.e., each communications system depicts two transmitters and two receivers). However, the techniques presented herein are not limited to two-users, and can alternatively be applied to multi-user interference channels with more than two users, including general multi-user Gaussian interference channels. For example, if there are more than two users, then a desired user is represented by a primary transmitter-receiver pair (e.g., transmitter 304 and receiver 334 of FIG. 3), and the interference from all non-primary users is modeled as the sum of the interference produced by the non-primary users (non-primary users will also be referred to as secondary users, and non-primary transmitters and receivers will also be referred to as secondary transmitters and receivers, respectively). For example, in FIG. 3, the term $h_{12}(m)$ can be used to absorb (or "capture") the interference produced by all non-primary users. In the case of M total users, the symbol-wise joint ML detector operates by determining the closest point $(x_1, x_2, \ldots, x_M)$ from among the combined constellation points for the M users. The symbol-wise joint ML detector then selects the user of interest for detection.

Figure 4A:
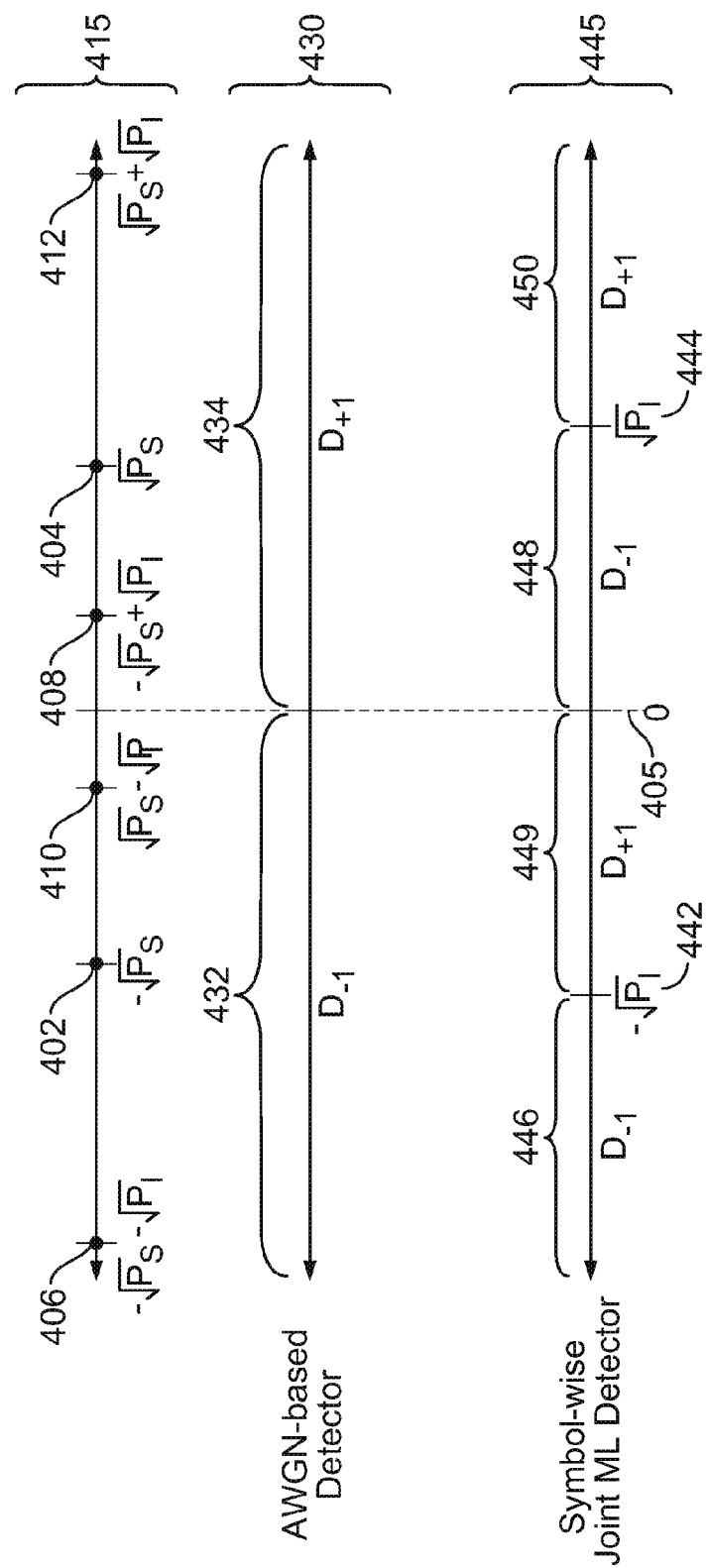
FIGS. 4A and 4B show the decision regions of a symbol-by-symbol joint maximum-likelihood detector and an AWGN-based detector for the cases of strong and weak interference, respectively.

FIG. 4A shows the decision regions of the symbol-wise joint ML detector proposed herein, and the AWGN-based detector, in accordance with an embodiment. Diagram 400 illustrates the case where an encoder, for example, similar or identical to finite alphabet encoder 305 or 309 (both of FIG. 3) uses BPSK modulation, and where the interference is strong (i.e., SIR≦0). For example, FIG. 4A has been generated for the case where transmitter 304 (FIG. 3) transmits an amplitude value of $\sqrt{P_S}$ for a logical '1' bit and an amplitude value of $-\sqrt{P_S}$ for a logical '−1' bit, where $P_s$ denotes the average receive power per symbol. The interference signal is assumed to have average signal power $P_I$, which is stationary across received symbols. The strong interference assumption further implies that $P_I > P_S$. Further, it is assumed that $z_1(m)$ and $z_2(m)$ are each zero-mean stationary AWGN noise sequences that are independent of each other, each having a non-negative variance.

Plot 415 shows the possible output points of symbol-by-symbol detector 338 (FIG. 3) ignoring the effects of AWGN in accordance with an embodiment. When a logical '1' is transmitted, for example, by transmitter 304 (FIG. 3), output 404 would be received in the absence of interference and AWGN. The presence of interference may result in output 408 or output 412 being received. Specifically, if the interferer transmits a logical '1,' then output 412 may be received, and if the interferer transmits a logical '−1,' then output 408 may be received. Similarly, if the intended transmitter, e.g., transmitter 304, transmits a logical '−1,' then output 402 may be received in the absence of AWGN and interference. However, in the presence of interference output 406 may be received if the interferer transmits a logical '−1' and output 408 may be received if the interferer transmits a logical '1'. Further, the presence of AWGN means that any point on plot 415 may be received, as the AWGN noise distribution has infinite support.

Plot 430 depicts the decision regions of the AWGN-based detector in accordance with an embodiment. For example, the AWGN-based detector may be implemented by symbol-by-symbol detector 338 or 342 (both of FIG. 3). The AWGN-based detector treats interference as zero-mean additive Gaussian noise. Therefore, the AWGN-based detector assigns every positive output point to a logical '1' and every negative (or equivalently, non-positive) output point to logical '−1.' Therefore, the decision regions of the AWGN-based decoder (as well as those of the symbol-wise joint ML decoder) may be based on Euclidean-distance, as shown in plot 430, where if the detector output lies in region 434, covering the positive detector output values, then a '1' is declared, e.g., by hard decoder 340, and if the detector output lies in region 432, covering the negative detector output values, then a '−1' is declared, e.g., by hard decoder 340.

Plot 445 depicts the decision regions of the symbol-wise joint ML detector in accordance with an embodiment. For example, the symbol-wise joint ML detector may be implemented by symbol-by-symbol detector 338 or 342 (both of FIG. 3). In comparison to plot 430, plot 445 includes more than two decision regions. This is because when the statistics of the interference are considered, there are four (rather than two) Gaussian distributions used to determine the decision regions of plot 445. The decision regions of the symbol-wise joint ML detector are as shown in plot 445, where if the detector output lies in region 446 or 448, a '−1' is declared, e.g., by hard decoder 340, and if the detector output lies in region 449 or 450, a '1' is declared, e.g., by hard decoder 340.

Figure 4B:
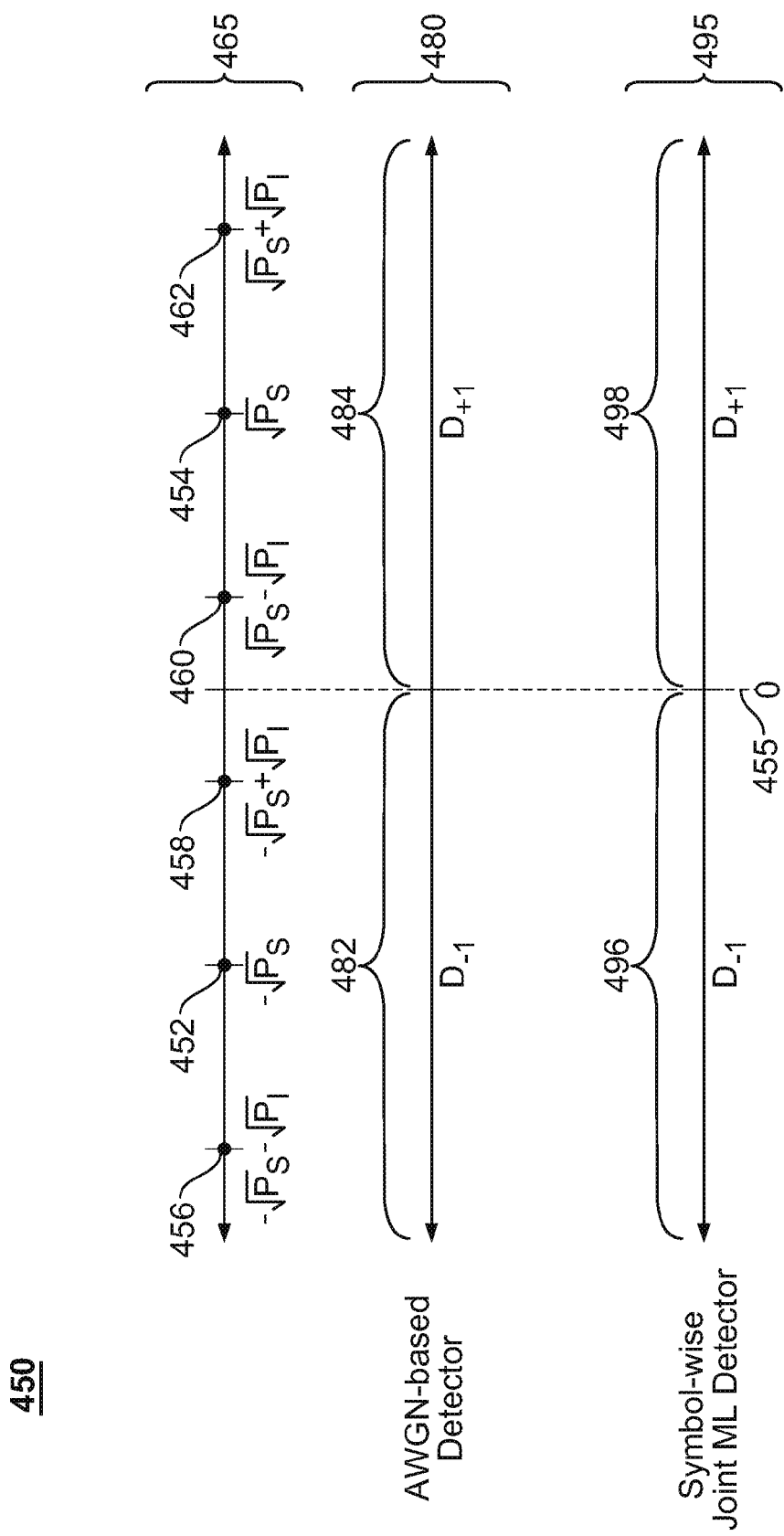

FIG. 4B shows the decision regions of the symbol-wise joint ML detector proposed herein, and the AWGN-based detector, in accordance with an embodiment. Diagram 450 illustrates the case where an encoder, for example, finite alphabet encoder 305 or 309 (both of FIG. 3) use BPSK modulation, and where the interference is weak (i.e., SIR>0). FIG. 4B illustrates the case where transmitters 304 and 308 (both of FIG. 3) transmit an amplitude value of $\sqrt{P_S}$ for a logical '1' bit and an amplitude value of $-\sqrt{P_S}$ for a logical '−1' bit, where $P_S$ again denotes the average receive power per symbol. The interference signals are each assumed to have average signal power $P_I$, which is stationary across received symbols, where the weak interference assumption implies that $P_I < P_S$. Further, it is assumed that $z_1(m)$ and $z_2(m)$ are each zero-mean stationary AWGN noise sequences that are independent of each other having a non-negative variance.

Plot 465 shows the possible output points of symbol-by-symbol detector 338 (FIG. 3), or alternatively, of symbol-by-symbol detector 342 (FIG. 3), ignoring the effects of AWGN in accordance with an embodiment. When a logical '1' is transmitted, for example, by transmitter 304 (FIG. 3), output 454 would be received in the absence of interference and AWGN. However, the presence of interference may result in output 460 or output 462 being received. Specifically, if the interferer (e.g., transmitter 308 may act as an interferer to the transmissions of transmitter 304, as depicted in FIG. 3) transmits a logical '1,' then output 462 may be received, and if the in interferer transmits a logical '−1,' then output 460 may be received. Similarly, if the intended transmitter, e.g., transmitter 304, transmits a logical '−1,' then output 452 may be received in the absence of AWGN and interference. However, in the presence of interference, output 456 may be received if the interferer transmits a logical '−1' and output 458 may be received if the interferer transmits a logical '1'. Further, the presence of AWGN means that any point on plot 465 may be received, as the AWGN noise distribution has infinite support.

Plot 480 depicts the decision regions of the AWGN-based detector in accordance with an embodiment. For example, the AWGN-based detector may be implemented by symbol-by-symbol detector 338 or 342 (both of FIG. 3). As described in relation to FIG. 4A, the AWGN-based detector treats interference as zero-mean additive Gaussian noise. Therefore, the AWGN-based detector assigns every positive output point to a logical '1' and every negative (or equivalently, non-positive) output point to logical '−1.' Therefore, as shown by the decision regions of the AWGN-based decoder in plot 480, if the detector output lies in region 484, covering the positive detector output values, then a '1' is declared, e.g., by hard decoder 340 (FIG. 3), and if the detector output lies in region 482, covering the negative detector output values, then a '−1' is declared, e.g., by hard decoder 340 (FIG. 3).

Plot 495 depicts the decision regions of the symbol-wise joint ML detector in accordance with an embodiment. For example, the symbol-wise joint ML detector may be implemented by symbol-by-symbol detector 338 or 342 (both of FIG. 3). Plot 445 depicts the same decision regions are plot 480 of the AWGN-based detector. FIGS. 4A and 4B show that when BPSK is used by the transmitter, for example, transmitter 304 and/or 308 (both of FIG. 3), and when the interference is weak (i.e., SIR>0), the decision regions of the AWGN-based detector are the same as those of the symbol-wise joint ML detector. However, when the interference is strong (i.e., SIR≦0), the decision regions of the AWGN-based detector and those of the symbol-wise joint ML detector may be different. Further, when one or both of the transmitters, e.g., transmitter 304 or 308 do not use BPSK, then the decision regions of the AWGN-based detector and those of the symbol-wise joint ML detector may be different, even for the case of weak interference (i.e., SIR>0).

The successive interference cancellation (SIC) detector operates by decoding the signal of a primary user from a received signal, re-encoding the decoded bits, and subtracting the re-encoded signal from the received signal. The SIC detector then decodes the signal of the second user, and so on, until the signal of each user has been decoded. In particular, the symbol-by-symbol SIC detector for the interference channel works as follows. To decode symbol $x_1$, the primary receiver obtains an estimate $\hat{x}_2$ of symbol $x_2$ first treating $x_1$ as Gaussian. Then the SIC detector detects $x_1$ by subtraction from the received signal according to $y_1 - h_{12}\hat{x}_2$. The performance of the SIC detector is optimal or near-optimal when the power of the interference is much larger than the power of the desired signal. On the other hand, when the power of the interference is much smaller than that of the desired signal, the AWGN-based detector may perform better than the SIC detector. Based on this observation, an ordered SIC detector can also be considered. For example, when BPSK is used in both transmitters, symbol $x_1$ can be directly estimated for SIR≧0 dB, whereas the SIC detector can be used for SIR<0 dB (e.g., see FIG. 5).

Figure 5:
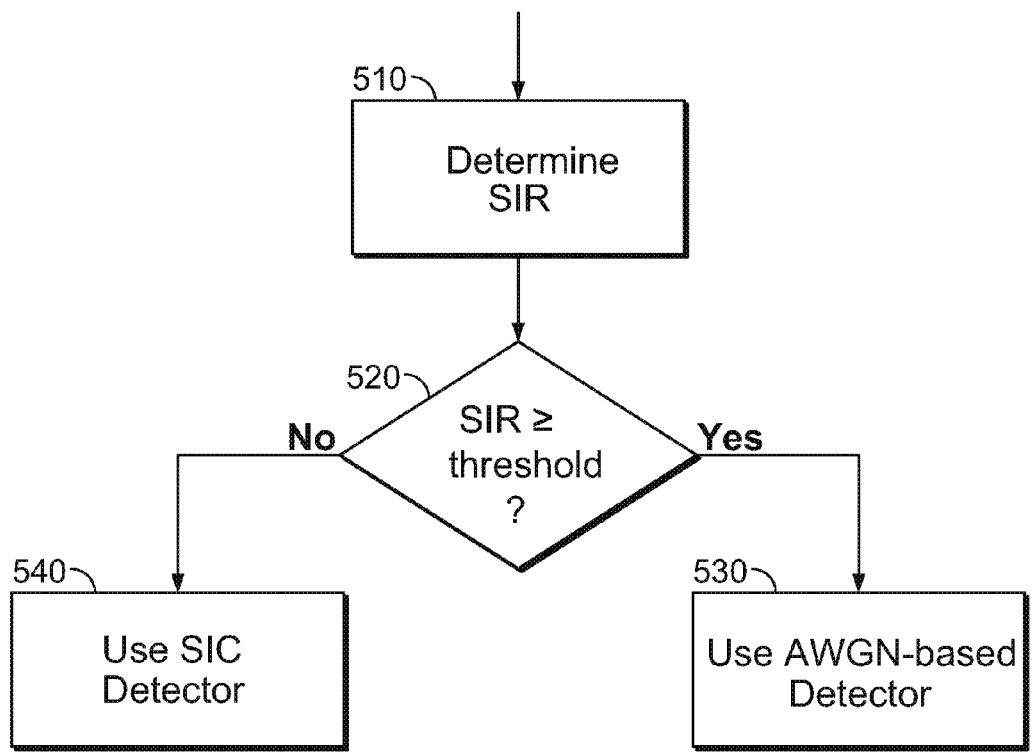
FIG. 5 shows a simplified process that may be used to decode received symbols.

FIG. 5 shows a simplified process that may be used to decode received symbols, e.g., received symbols 330 or 332 (both of FIG. 3), in accordance with an embodiment. Process 500 may be used, e.g., by symbol-by-symbol detector 338 and/or 342 (both of FIG. 3) to decrease the computational complexity of the decoding process relative to the symbol-wise joint ML decoder, and may be used, for example, when transmitter 304 and/or 308 uses BPSK modulation.

At step 510, process 500 determines (for example, obtains or estimates) the SIR of the symbols received at the decoder. For example, in an embodiment, process 500 is used by symbol-by-symbol decoder 338 (FIG. 3). Symbol-by-symbol decoder 338 (FIG. 3) may then measure or estimate the SIR of, e.g., received symbols 330 (FIG. 3) by, for example, using training data embedded in received symbols 330 (FIG. 3), and/or by using a suitable detection or estimation technique.

At step 520, process 500 may determine if the SIR is greater than or equal to a threshold value. For example, the threshold value may be set to determine if the interference power is greater than the power of the desired signal. In an embodiment, the threshold at step 520 is set to a value 0 (e.g., if the SIR determined at step 510, is measured on a logarithmic scale) or to a value 1 (e.g., if the SIR determined at step 510, is measured on a standard or non-logarithmic scale).

If, at step 520, it is determined that the SIR exceeds the threshold (i.e., is the interference is sufficiently weak), then the AWGN-based detector is used to decode the received symbols at step 530. For example, the AWGN-based detector may be used at step 530 according to the techniques described in FIGS. 4A and 4B. However, if, at step 520, it is determined that the SIR is less than (or equal to) the tested threshold (i.e., if the interference is determined to be sufficiently strong), then the SIC detector may be used to decode the received symbols at step 540.

The performance of the proposed symbol-wise joint ML detector is now disclosed, relative to the convention AWGN-based detector and the SIC detector, when BPSK is used by both the intended and the interfering transmitter (e.g., intended transmitter 304 and interfering transmitter 308 of FIG. 3). The SER may be derived, e.g., using the locations of the plots of FIGS. 4A and 4B using standard communications system analysis. Although it is not difficult to derive exact SER expressions, the derivations are generally long and complicated. Therefore, only approximate SER expressions are disclosed herein. The approximate SER expressions are based on the nearest neighbor union bound (NNUB) approach. The derivation of the SER expressions below are based on finding the minimum distance between points of the constellation $h_{11}S_1+h_{12}S_2$ that decode to different values for $x_1$. The derivations are omitted for brevity.

Using the NNUB approach, an approximation to the SER for the AWGN-based detector, when BPSK is used by both transmitters, may be shown to be $$P_{e,conv} \approx \begin{cases} \frac{1}{2}Q(\sqrt{SNR} - \sqrt{INR}), & SIR \geq 1 \\ \frac{1}{2} - \frac{1}{2}Q(\sqrt{INR} - \sqrt{SNR}), & SIR < 1, \end{cases} \quad (3)$$

where $$Q(x) = \frac{1}{\sqrt{2\pi}} \int_x^\infty e^{-t^2/2} dt$$

is the Gaussian Q-function, SNR is the signal-to-noise ratio, and INR is the interference-to-noise ratio. Similarly, an approximation to the SER for the symbol-wise joint ML detector may be shown to be $$P_{e,jointML} \approx \begin{cases} \frac{1}{2}Q(\sqrt{SNR} - \sqrt{INR}), & SIR \geq 1 \\ \frac{1}{2}Q(\sqrt{INR} - \sqrt{SNR}), & \frac{1}{4} \leq SIR < 1 \\ Q(\sqrt{SNR}), & SIR < \frac{1}{4}, \end{cases} \quad (4)$$

where the SIR is assumed to be measured in standard (i.e., non-logarithmic) form. Further, an approximation to the SER for the SIC detector may be shown to be $$P_{e,SIC} \approx \begin{cases} \frac{1}{2}Q(\sqrt{SNR} - 2\sqrt{INR}), & SIR \geq 4 \\ \frac{1}{2} - \frac{1}{2}Q(\sqrt{SNR} - \sqrt{INR}), & \frac{9}{4}SIR < 4 \\ \frac{1}{2} - \frac{1}{2}Q(2\sqrt{INR} - \sqrt{SNR}), & 1 \leq SIR < \frac{9}{4} \\ \frac{1}{2}Q(\sqrt{INR} - \sqrt{SNR}), & \frac{1}{4} \leq SIR < 1 \\ Q(\sqrt{SNR}), & SIR < \frac{1}{4}. \end{cases} \quad (5)$$

Based on equations (3), (4), and (5), above, the performance of the symbol-wise joint ML detector may be characterized as follows. For SIR≧1, the minimum distance in the signal constellation of the desired signal is reduced by the interference. For ¼≦SIR<1, the symbol-wise joint ML detector behaves as if the minimum distance in the signal constellation of the interference were reduced by the desired signal. For SIR<¼, the interference is very strong and does not affect the SER performance of the symbol-wise joint ML detector. This agrees with the information theoretic results for the strong interference channel. Comparing equations (3) and (4), it follows that the symbol-wise joint ML detector outperforms the AWGN-based detector for SIR<1. Further, it can be shown that the SER of the AWGN-based detector exceeds ¼ for SIR<1.

Although the derivations above are for BPSK, the SER for other modulation schemes may be derived using the NNUB approach and similar techniques. Although the resulting expressions for SER are typically quite complicated, it may be shown that the performance of the AWGN-based detector is the same as that of the symbol-wise joint ML detector for SIR larger than an upper threshold value, $SIR_{th}$. Further, it may be shown that the AWGN-based detector exhibits an error floor for SIR values smaller than a lower threshold, $SIR_{th}$. For example, for BPSK, $SIR_{th}=1$.

The complexity of the AWGN-based detector and the symbol-wise joint ML detector are now discussed. Let $M_1$ and $M_2$ denote the constellation size of the intended and interfering transmitters, e.g., transmitter 304 and 308, respectively. For the intended receiver, at most $M_1-1$ comparisons are needed when the conventional detector is employed. The maximum number of comparisons for the symbol-wise joint ML detector is equal to $M_1M_2-1$. Although more comparisons are needed by the symbol-wise joint ML detector, this increase in computational complexity is not significant compared to the computational complexity of the other parts of the communications receiver. For example, the communications receiver (e.g., receiver 334) may use a Viterbi decoder (e.g., as hard decoder 340), which requires significantly more complexity than the increase in complexity of the symbol-wise joint ML decoder over the AWGN-based decoder. Moreover, in practical implementation, the number of comparison operations may be reduced substantially by optimizing the design of a slicer. For example, for the AWGN-based detector, a received symbol, e.g., from received symbols 330, may only need to be compared with two neighboring constellation symbols (or, four neighboring constellation symbols in the case of QAM modulation). The comparisons made by the decoder, e.g., hard decoder 340 or 344 (both of FIG. 3) may therefore be achieved by rounding the least-significant bits of the fixed-point representation of the equalized received symbol. Similar principles may be applied to the design of the symbol-wise joint ML detector to reduce computational complexity.

What is claimed is:

1. A method for decoding a set of message bits from a set of symbols, the set of symbols having been transmitted over a channel by a primary transmitter and one or more secondary transmitters, the method comprising:
    filtering the set of received symbols, each symbol in the set of received symbols comprising interference and additive noise;
    determining a set of constellation points, each point in the set of constellation points obtained by combining a first encoding set associated with the primary transmitter and one or more secondary encoding sets associated with the one or more secondary transmitters;
    selecting a first symbol from the set of filtered received symbols, and determining a value of a point in the set of constellation points that is closest to the first symbol;
    selecting a second symbol from the set of filtered received symbols, and determining a value of a point in the set of constellation points that is closest to the second symbol;
    outputting the determined values of the points associated with the first selected symbol and the second selected symbol; and
    decoding the set of message bits, based, at least in part, on the values associated with the first and second selected symbols.

2. The method of claim 1, wherein the first encoding set corresponds to Binary Phase Shift Keying (BPSK).

3. The method of claim 1, wherein the interference corresponds to transmissions of the one or more secondary transmitters.

4. The method of claim 1, wherein determining the value of the point in the set of constellation points that is closest to the first symbol comprises determining the Euclidean distance between the first symbol and one or more symbols in the set of constellation points.

5. The method of claim 1, wherein filtering the set of received symbols comprises applying a band-pass filter to the set of received symbols.

6. The method of claim 1, wherein filtering the set of received symbols comprises determining a signal-to-interference ratio associated with the set of received symbols and applying an ordered successive interference cancellation (SIC) detector to the set of received symbols.

7. The method of claim 1, wherein the first encoding set and the one or more secondary encoding sets correspond to the same modulation type.

8. The method of claim 1, wherein the primary transmitter and the one or more secondary transmitters operate asynchronously.

9. The method of claim 6, wherein if the signal-to-interference ratio is below a threshold, a SIC detector is used to decode the set of message bits.

10. The method of claim 6, wherein if the signal-to-interference ratio is above a threshold, an AWGN-based decoder is used to decode the set of message bits.

11. A system for decoding a set of message bits from a set of symbols, the set of symbols having been transmitted over a channel by a primary transmitter and one or more secondary transmitters, the method comprising:
    filtering the set of received symbols, each symbol in the set of received symbols comprising interference and additive noise;
    determining a set of constellation points, each point in the set of constellation points obtained by combining a first encoding set associated with the primary transmitter and one or more secondary encoding sets associated with the one or more secondary transmitters;
    selecting a first symbol from the set of filtered received symbols, and determining a value of a point in the set of constellation points that is closest to the first symbol;
    selecting a second symbol from the set of filtered received symbols, and determining a value of a point in the set of constellation points that is closest to the second symbol;
    outputting the determined values of the points associated with the first selected symbol and the second selected symbol; and
    decoding the set of message bits, based, at least in part, on the values associated with the first and second selected symbols.

12. The system of claim 11, wherein the first encoding set corresponds to Binary Phase Shift Keying (BPSK).

13. The system of claim 11, wherein the interference corresponds to transmissions of the one or more secondary transmitters.

14. The system of claim 11, wherein determining the value of the point in the set of constellation points that is closest to the first symbol comprises determining the Euclidean distance between the first symbol and one or more symbols in the set of constellation points.

15. The system of claim 11, wherein filtering the set of received symbols comprises applying a band-pass filter to the set of received symbols.

16. The system of claim 11, wherein filtering the set of received symbols comprises determining a signal-to-interference ratio associated with the set of received symbols and applying an ordered successive interference cancellation (SIC) detector to the set of received symbols.

17. The system of claim 11, wherein the first encoding set and the one or more secondary encoding sets correspond to the same modulation type.

18. The system of claim 11, wherein the primary transmitter and the one or more secondary transmitters operate asynchronously.

19. The system of claim 16, wherein if the signal-to-interference ratio is below a threshold, a SIC detector is used to decode the set of message bits.

20. The system of claim 16, wherein if the signal-to-interference ratio is above a threshold, an AWGN-based decoder is used to decode the set of message bits.

* * * * *